(12) United States Patent
Bergman et al.

(10) Patent No.: US 9,056,318 B2
(45) Date of Patent: *Jun. 16, 2015

(54) ASSAY DEVICE AND METHOD

(75) Inventors: David Bergman, Uppsala (SE); Ib Mendel-Hartvig, Uppsala (SE); Simon Uhrberg, Uppsala (SE)

(73) Assignee: JOHNSON & JOHNSON AB (SE)

( * ) Notice: Subject to any disclaimer, the term of this patent is extended or adjusted under 35 U.S.C. 154(b) by 1752 days.

This patent is subject to a terminal disclaimer.

(21) Appl. No.: 10/560,138

(22) PCT Filed: Mar. 23, 2005

(86) PCT No.: PCT/SE2005/000429
§ 371 (c)(1),
(2), (4) Date: Mar. 7, 2007

(87) PCT Pub. No.: WO2005/089082
PCT Pub. Date: Sep. 29, 2005

(65) Prior Publication Data
US 2007/0266777 A1    Nov. 22, 2007

(30) Foreign Application Priority Data
Mar. 24, 2004  (SE) ...................................... 0400662

(51) Int. Cl.
  C12M 1/34      (2006.01)
  B01L 99/00    (2010.01)
  (Continued)

(52) U.S. Cl.
  CPC ....... *B01L 3/50273* (2013.01); *B01J 20/28014* (2013.01); *B01L 3/502746* (2013.01);
  (Continued)

(58) Field of Classification Search
  None
  See application file for complete search history.

(56) References Cited

U.S. PATENT DOCUMENTS 5,660,798 A * 8/1997 Doshi et al. .................... 422/101
5,707,799 A * 1/1998 Hansmann et al. .......... 435/6.11
(Continued)

FOREIGN PATENT DOCUMENTS

EP  0348006   12/1993
EP  1120164   8/2001
(Continued)

OTHER PUBLICATIONS

International Search Report mailed Jul. 26, 2005, for international patent application No. PCT/SE2005/000429, filed Mar. 23, 2005, 4 pages.
(Continued)

*Primary Examiner* — Chris L Chin
(74) *Attorney, Agent, or Firm* — Hiscock & Barclay LLP

(57) ABSTRACT

A device and method for the separation of a component in a liquid sample prior to the detection of an analyte in said sample, wherein a sample is added to a receiving zone on a substrate, said substrate further optionally comprising a reaction zone, a transport or incubation zone connecting the receiving and reaction zone, respectively, forming a flow path on a substrate, wherein said substrate is a non-porous substrate, and at least part of said flow path consists of areas of projections substantially vertical to said surface, and having a height (H), diameter (D) and reciprocal spacing (t1, t2) such, that lateral capillary flow of said liquid sample in said zone is achieved, and where means for separation are provided adjacent to the zone for receiving the sample. Said means for separation are chosen among filter means, optionally enhanced by affinity binding and/or aggregation; magnetic means, also optionally enhanced by affinity binding and/or aggregation; and acoustic means.

29 Claims, 6 Drawing Sheets

Figure 1A:
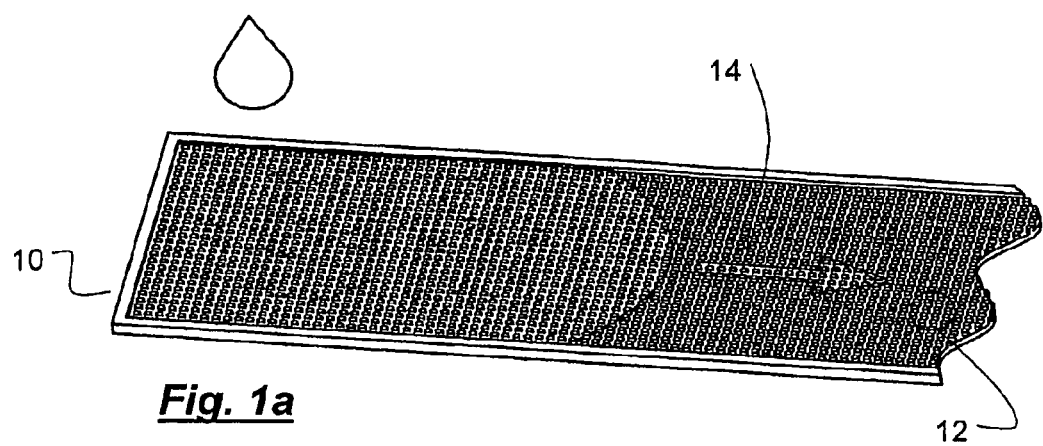

(51) Int. Cl.
    *B01L 3/00*    (2006.01)
    *B01J 20/28*    (2006.01)
    *G01N 33/543*    (2006.01)

(52) U.S. Cl.
    CPC ..... *B01L3/502753* (2013.01); *B01L 3/502761* (2013.01); *B01L 2200/0668* (2013.01); *B01L 2300/0681* (2013.01); *B01L 2300/0825* (2013.01); *B01L 2300/087* (2013.01); *B01L 2400/0406* (2013.01); *B01L 2400/0439* (2013.01); *B01L 2400/086* (2013.01); *G01N 33/54386* (2013.01); *B01L 2300/161* (2013.01)

(56) References Cited

U.S. PATENT DOCUMENTS

| | | | |
|---|---|---|---|
| 5,837,115 | A | 11/1998 | Austin et al. |
| 5,885,527 | A | 3/1999 | Buechler |
| 6,113,855 | A * | 9/2000 | Buechler ............ 422/412 |
| 6,143,576 | A | 11/2000 | Buechler |
| 6,156,270 | A | 12/2000 | Buechler |
| 6,368,871 | B1 | 4/2002 | Christel et al. |
| 6,762,059 | B2 | 7/2004 | Chan et al. |
| 6,767,510 | B1 | 7/2004 | Buechler |
| 7,217,562 | B2 * | 5/2007 | Cao et al. ............ 435/287.2 |
| 8,333,934 | B2 * | 12/2012 | Cao et al. ............ 422/502 |
| 8,722,423 | B2 * | 5/2014 | Bergman et al. ............ 436/514 |
| 2002/0142351 | A1 * | 10/2002 | Diamond ............ 435/7.1 |
| 2003/0035758 | A1 | 2/2003 | Buechler et al. |
| 2004/0033515 | A1 * | 2/2004 | Cao et al. ............ 435/6 |
| 2004/0077103 | A1 | 4/2004 | Buechler |
| 2004/0126767 | A1 | 7/2004 | Anderberg et al. |
| 2005/0136552 | A1 * | 6/2005 | Buechler ............ 436/514 |
| 2007/0020772 | A1 * | 1/2007 | Cao et al. ............ 438/1 |

FOREIGN PATENT DOCUMENTS

| | | |
|---|---|---|
| EP | 1371984 | 12/2003 |
| EP | 0985146 | 3/2005 |
| WO | WO-92/01226 | 1/1992 |
| WO | WO-03/103835 | 12/2003 |
| WO | WO-2004/037374 | 5/2004 |
| WO | PCT/SE2005/00787 | 5/2005 |

OTHER PUBLICATIONS

Written Opinion issued Jul. 26, 2005, for international patent application No. PCT/SE2005/000429, filed Mar. 23, 2005, 3 pages.

International Search Report mailed Sep. 6, 2005, for international patent application No. PCT/SE2005/000787, filed May 26, 2005, 3 pages.

Written Opinion mailed Sep. 6, 2005, for international patent application No. PCT/SE2005/000787, filed May 26, 2005, 3 pages.

* cited by examiner

ASSAY DEVICE AND METHOD

CROSS REFERENCE TO RELATED APPLICATIONS

This application is a U.S. National Stage Application of International application number PCT/SE2005/000429, filed Mar. 23, 2005, which claims priority to Swedish Application Serial No. SE 0400662-3, filed Mar. 24, 2004, both of which are hereby incorporated by reference in their entirety.

The present invention concerns an assay device or assay system or a component thereof, for use in the detection of one or more analytes in a sample, as well as method for the use of said device or component, and methods for detection of an analyte, using said device. The invention in particular concerns devices, components and methods for applications, where a component of the sample needs to be separated before or during the reaction for detection of the analyte.

BACKGROUND

Analytical and diagnostic determinations are frequently performed on liquid samples, comprising in addition to the analyte of interest, also countless other components, in solution and/or in particulate form, which often interfere with the handling of the sample and may influence the quantitative or qualitative determination of the analyte.

For example, numerous clinical diagnostic methods are based on the detection of an analyte in a biological sample. Frequently, such detection is achieved in a disposable assay device, allowing rapid and simple diagnosis. One important application is the wide field of immunology, where analytes are detected with the aid of specific antibodies, capable of binding to the analytes and forming detectable complexes, usually with the aid of ligands aiding the detection.

When performing a test using a biological sample from a patient, in particular a blood sample, many factors need to be considered. Whole blood is prone to clotting, reducing or preventing the desired flow of the sample in the assay device. The red blood cells, even in the absence of clotting, may inhibit or retard flow. Further, red blood cells may inhibit binding between specific binding pair members. Red blood cells also have enzymatic activity, which, depending on the assay employed, may interfere with the signal produced.

Unfortunately, red blood cells present in whole blood also scatter and absorb light thus interfering with assay methodologies which measure either reflected or transmitted light. Also other cells may interfere with particular determinations; for example, cholesterol determinations can be effected by cholesterol present in cell membranes.

Further, the red cell fraction takes up a considerable volume of the sample, in some cases as much as half the volume. Importantly, this fraction, also called hematocrit, may vary between different individuals and even in the same individual, between different measurements. This in turn may influence the accuracy and/or the repeatability of the determinations.

Consequently many assays involve a step of separating the red blood cells, whereupon the assay is carried out on plasma or serum. When the separation is performed before clotting, plasma is obtained. When clotting has occurred before separation, serum is obtained.

The red blood cells can be separated from plasma through centrifugation, which however requires a relatively large volume of sample, and the use of a centrifuge. This is also time consuming and constitutes an additional step of handling the sample, which increases cost and complexity, and which further should be avoided in particular when potentially contagious blood-borne pathogens are involved. Additionally, the risk of the sample being contaminated by the individuals handling it, cross-contaminated by parallel samples or mixed up with other samples is increased.

What is said above regarding whole blood samples and red blood cells applies also, with necessary adaptations, to all other biological samples, where cells, cell debris, fibres, or other unwanted particles etc., may interfere with the determination and should therefore preferably be separated before or during the reaction or determination leading to the detection of the analyte.

The most common type of disposable assay device consists of a zone or area for receiving the sample, a reaction zone, and optionally a transport or incubation zone connecting the receiving and reaction zone, respectively. These assay devices are known as chromatography assay devices or simply referred to as strip tests. They employ a porous material defining a path for fluid flow capable of supporting capillary flow, e.g. a filter material. The sample-receiving zone frequently consists of a more porous material, capable of absorbing the sample, and, when the separation of blood cells is desired, effective to trap the red blood cells. Examples of such materials are fibrous materials, such as paper, fleece, gel or tissue, comprised e.g. of cellulose, wool, glass fibre, asbestos, synthetic fibres, polymers, etc. or mixtures of the same. The transport or incubation zone commonly consists of the same or similar materials, often with another porosity than the sample-receiving zone. Likewise, the reaction zone, which may be integrated with the incubation zone, or constituting the most distal part thereof, commonly consists of similar, absorbing fibrous materials, or any of the above listed materials.

In an assay device or strip test, the porous material(-s) is (are) assembled on a carrier, such as a strip of thermoplastic material, paper, cardboard or the like. Further, a cover can be provided, said cover having at least one aperture for receiving the sample, and an aperture or transparent area for reading the result of the assay.

Nitrocellulose materials are also frequently used as the matrix constituting the transport or reaction zone, connecting the receiving zone and the reaction zone. A significant disadvantage with nitrocellulose is its high non-specific binding of proteins and other bio-molecules. Present test strips however often handle a surplus of sample, reducing the influence of this binding. It is however desirable to minimise the sample volume, in line with the tendency to miniaturize the entire test, including minimising the amounts of reagents, without compromising accuracy and reliability.

PRIOR ART

EP 1 371 984 discloses a chromatographic assay device and method for detecting the presence of an analyte in a sample of whole blood, utilizing a red blood cell separating agent to aggregate red blood cells and permit plasma or serum to flow by capillary action. The carrier material is exemplified as a paper (fibrous) material, or a membrane of cellulose, fibreglass, cloth, both naturally occurring and synthetic, as well as porous gels.

Although frequently used and well known in the art, the above carrier materials are associated with many drawbacks. The structure of the materials will always vary between different batches, and also within the material, due to the random distribution of the fibres, e.g. in a fibrous material, or cavities, e.g. in a gel-like material. Similarly, the chemical properties of the material, e.g. the distribution of chemicals added to the material, will inevitably vary for the same reasons as above.

WO 03/103835 discloses micro fluidic systems comprising a substrate, and, provided on said substrate, at least one flow path interconnecting with functional means in which liquid samples can be subjected to different desired procedures, said flow path comprising a plurality of vertical projections or so called micro posts protruding form said substrate.

SUMMARY OF THE INVENTION

The present invention makes available a device for the separation of a component in a liquid sample prior to the detection of an analyte in said sample, said device having a substrate comprising a zone for receiving the sample, a reaction zone, and optionally a transport or incubation zone connecting the receiving and reaction zone, respectively, forming a flow path on a substrate, wherein said substrate is a non-porous substrate, and at least part of said flow path consists of areas of projections substantially vertical to said surface, and having a height (H), diameter (D) and reciprocal spacing (t1, t2) such, that lateral capillary flow of said liquid sample in said zone is achieved, and where means for separation are provided within or adjacent to the zone for receiving the sample.

The invention also makes available a method for use in the detection of an analyte in a liquid sample, said detection taking place in a process on a substrate, where at least a subset of said sample is transported through capillary action from a receiving zone where said sample is added, to a zone where a reaction/detection takes place, said distance being defined as a flow path, wherein said substrate is a non-porous substrate, at least part of said flow path consists of areas of projections substantially vertical to said surface, and having a height (H), diameter (D) and reciprocal spacing (t1, t2) such, that lateral capillary flow of said liquid sample is achieved, and that separation of unwanted components is performed without interruption of said capillary flow.

The invention also encompasses embodiments of said device and method, as set forth in the description and claims, hereby incorporated in their entirety by reference.

SHORT DESCRIPTION OF THE DRAWINGS

The invention will be described in closer detail in the following description, examples, and attached drawings, in which FIG. 1a shows schematically an embodiment of the present invention, where a drop of sample is added to a substrate 10 having thereon a multitude of projections 12 substantially vertical to said surface. An arrow 14 indicates the direction of flow.

Figure 1B:
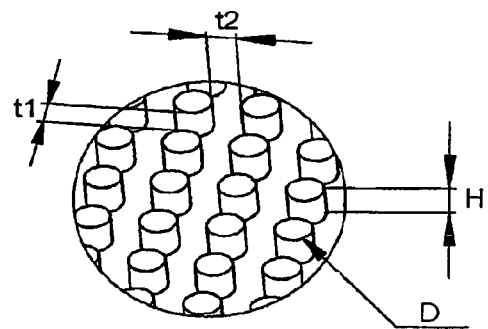

FIG. 1b is a partial view of the embodiment shown in FIG. 1a, showing one embodiment of said vertical projections, said projections having a height (H), diameter (D) and reciprocal spacing (t1, t2) such, that lateral capillary flow of said liquid sample in said zone is achieved.

Figure 2:
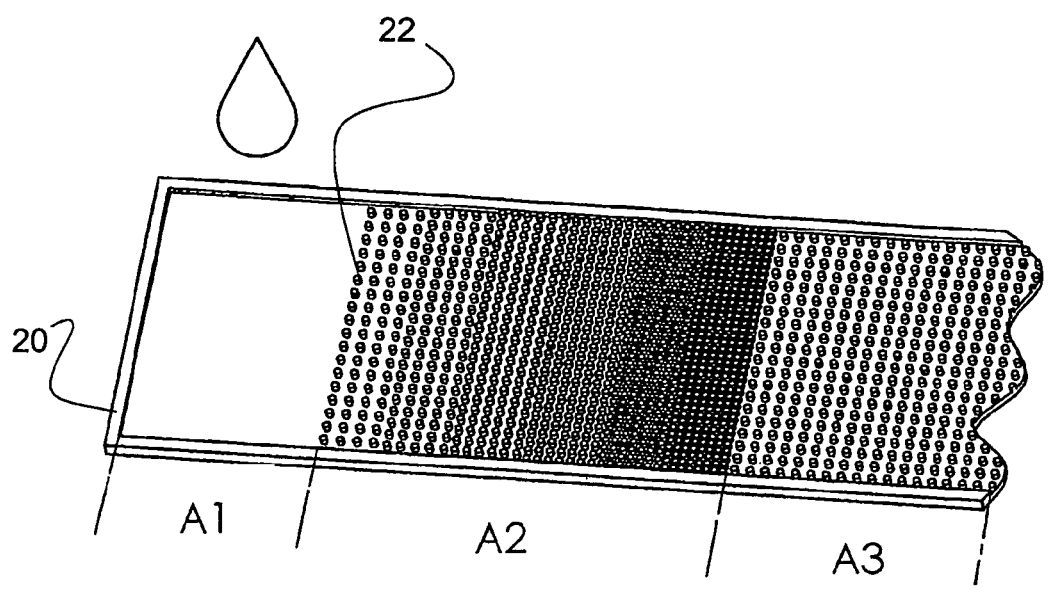

FIG. 2 shows schematically another embodiment of the present invention, where a drop of sample is added to a substrate 20 to an area A1 substantially without projections, bordering to a second area A2, having such projections 22. Over the area A2 the height (H), diameter (D) and reciprocal spacing (t1, t2) of the projections is varied so, that a gradual retaining or filtration effect is achieved, whereas the neighbouring area A3, acts as a transport and/or reaction zone.

Figures 3A, 3B:
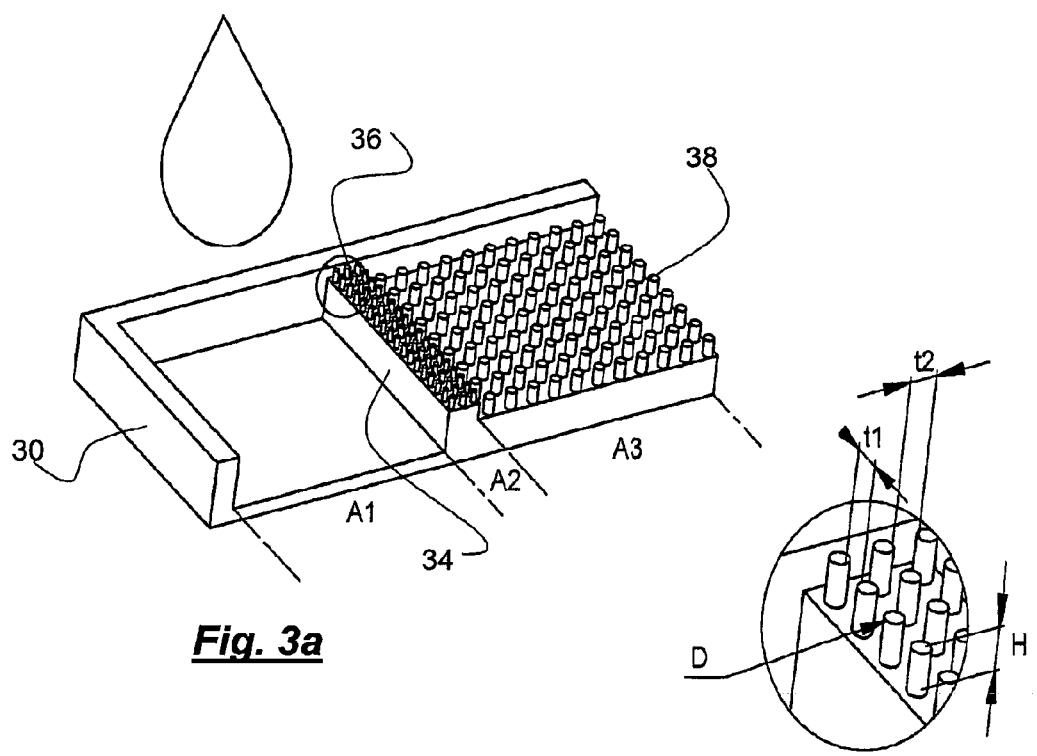

FIG. 3a shows schematically an embodiment of the present invention, where the sample-receiving zone or area A1 is lowered in relation to the remaining surface of the substrate 30, forming a threshold 34 between the sample-receiving zone, and the remaining lateral flow path. On the threshold 34 a second area A2 is provided, having first projections 36 supporting lateral flow but acting as a filter before the third and consecutive areas A3 having second projections 38. A1 thus acts as a basin for particulate substances found in the lateral flow, but prevented from passing the threshold by the projections 36. In this embodiment, the second area A2 is slightly higher than both the surrounding areas A1 and A3, and the projections on A2 have a height (H), diameter (D) and reciprocal spacing (t1, t2) different from that of the projections on A3 and possible consecutive areas (not shown).

FIG. 3b is a partial view of the embodiment shown in FIG. 3a, illustrating the dimensions of the first projections 36.

Figure 4A:
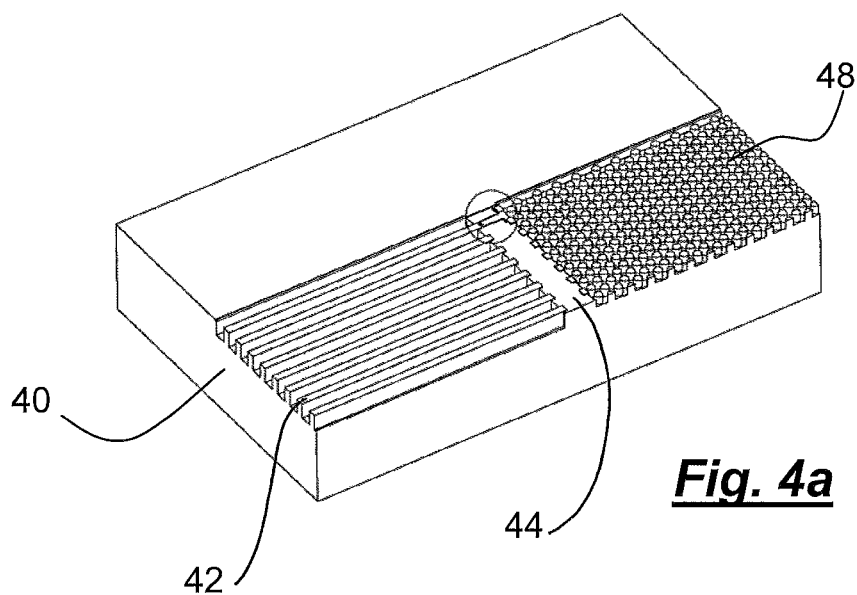

FIG. 4a shows schematically an embodiment of the present invention, where the lowered sample-receiving zone or area A1 provided in a substrate 40 has lateral grooves or ridges 42 leading to a threshold 44 between the sample-receiving zone and the remaining lateral flow path.

Figure 4B:
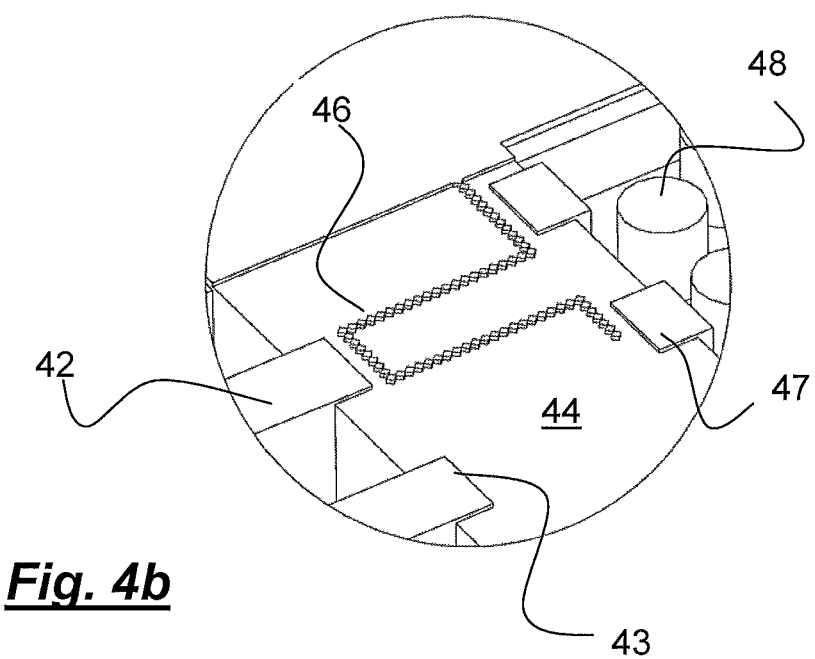

FIG. 4b shows a partial view of the embodiment shown in FIG. 4a, illustrating how, on the upper surface of the threshold 44, projections 46 are provided, different in size and/or configuration from the projections 48 in the remaining lateral flow path. Where the ridges 42 meet the proximal end of the threshold, elevated portions 43 are provided, engaging with and bridging the proximal edge of the threshold. Similarly, at the distal edge of the threshold, L-shaped elements form elevated portions, or "claws" 47, engaging and bridging the distal edge of the threshold. Said details 43 and 47 merely exemplify adaptations of the surfaces, improving the capillary action. In the separation of red blood cells, said projections 46 preferably have a height of at least about 10 µm and are positioned at a distance of about 3 µm from each other. The present partial view shows how the projections 46 are positioned single file, in a meandering pattern on the threshold 44. Several alternative patterns or arrangements are contemplated.

Figure 5A:
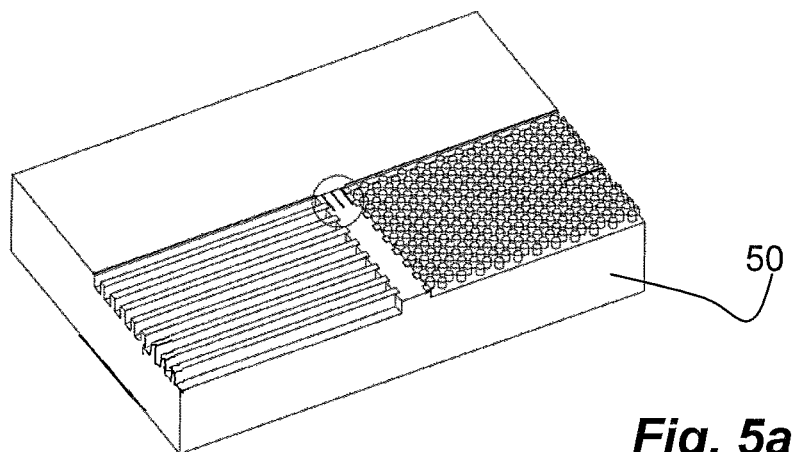

FIG. 5a schematically shows an alternative embodiment of the above, where on a substrate 50, two compartments are separated by a threshold, wherein the first compartment has longitudinal grooves and ridges leading up to said threshold and engaging with the same. Said second compartment preferably comprises the remaining functions normally associated with an assay, reaction and detection zones, etc.

Figure 5B:
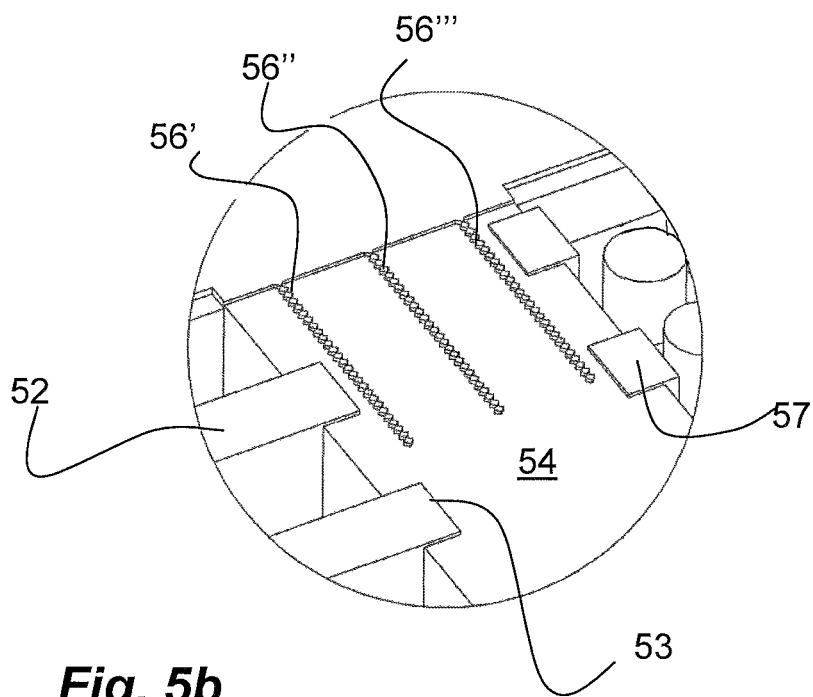

FIG. 5b shows a partial view of the above embodiment, indicating an alternative embodiment where, on the surface of the threshold 54, the vertical projections are arranged in substantially parallel lines of projections, here denoted 56', 56", and 56'". These may be the same or different, the difference being the shape, height, width, and distance between the projections. Again, where the ridges 52 meet the proximal end of the threshold 54, elevated portions 53 are provided, engaging with and bridging the proximal edge of the threshold. Similarly, at the distal edge of the threshold, L-shaped elements form elevated portions, or "claws" 57, engaging and bridging the distal edge of the threshold. Said details 53 and 57 merely exemplify adaptations of the surfaces, improving the capillary action.

Figure 6A:
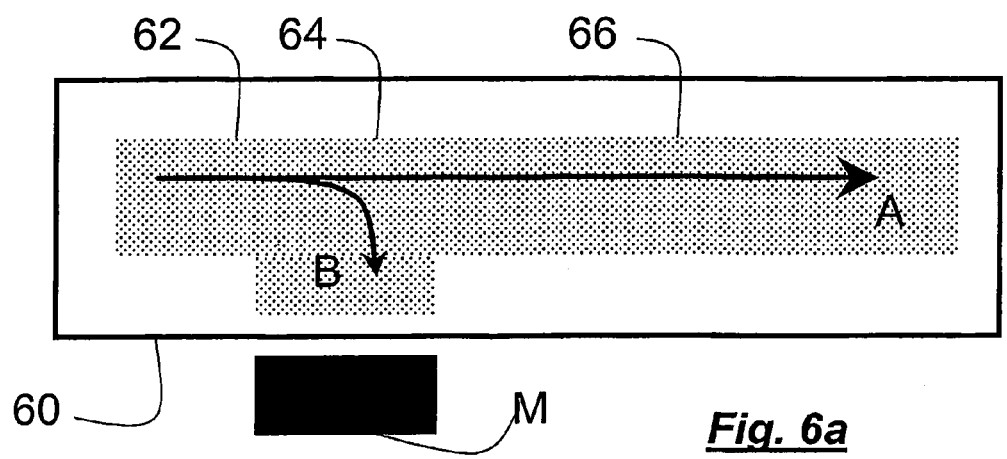

FIGS. 6a, b and c show schematically how magnetic means for separation of unwanted components of the sample can be arranged. While the magnet M is shown as positioned outside and separated from the substrate 60 in both FIGS. 6a and 6b, and in or on the substrate in FIG. 6c, these are only illustrations, and the invention encompasses embodiments where the magnet is integrated in the substrate, arranged adjacent to or at a distance from the substrate, as long as the magnetic force is sufficient to aid in the separation in question.

DESCRIPTION

Definitions

Before the present device and method is described, it is to be understood that this invention is not limited to the particular configurations, method steps, and materials disclosed herein as such configurations, steps and materials may vary somewhat. It is also to be understood that the terminology employed herein is used for the purpose of describing particular embodiments only and is not intended to be limiting since the scope of the present invention will be limited only by the appended claims and equivalents thereof.

It must also be noted that, as used in this specification and the appended claims, the singular forms "a", "an", and "the" include plural referents unless the context clearly dictates otherwise. Thus, for example, reference to a reaction mixture containing "an antibody" includes a mixture of two or more antibodies.

The term "about" when used in the context of numeric values denotes an interval of accuracy, familiar and acceptable to a person skilled in the art. Said interval can be 10% or preferably ±5%.

In describing and claiming the present invention, the following terminology will be used in accordance with the definitions set out herein.

The term "sample" here means a volume of a liquid, solution or suspension, intended to be subjected to qualitative or quantitative determination of any of its properties, such as the presence or absence of a component, the concentration of a component, etc. The sample may be a sample taken from an organism, such as a mammal, preferably a human; or from the biosphere, such as a water sample, or an effluent; or from an technical, chemical or biological process, such as a process of manufacturing, e.g. the production of medicaments, food, and feed, including cell culture and fermentation, or the purification of drinking water or the treatment of waste effluents. The sample may be subjected to qualitative or quantitative determination as such, or after suitable pre-treatment, such as homogenisation, sonication, filtering, sedimentation, centrifugation, heat-treatment etc.

Typical samples in the context of the present invention are body fluids such as blood, plasma, serum, lymph, urine, saliva, semen, gastric fluid, sputum, tear fluid etc.; environmental fluids such as surface water, ground water, sludge etc.; and process fluids such as milk, whey, broth, nutrient solutions, cell culture medium, etc. The present invention is applicable to all samples, but preferably to samples of body fluids, and most preferably to whole blood samples.

The determination based on lateral flow of a sample and the interaction of components present in the sample with reagents present in the device and detection of such interaction, either qualitatively or quantitatively, may be for any purpose, such as diagnostic, environmental, quality control, regulatory, forensic or research purposes. Such tests are often referred to as chromatography assays, or lateral flow assays, as in e.g. immunochromatography assays.

Examples of diagnostic determinations include, but are not limited to, the determination of analytes, also called markers, specific for different disorders, e.g. chronic metabolic disorders, such as blood glucose, blood ketones, urine glucose (diabetes), blood cholesterol (atherosclerosis, obesitas, etc); markers of other specific diseases, e.g. acute diseases, such as coronary infarct markers (e.g. troponin-T), markers of thyroid function (e.g. determination of thyroid stimulating hormone (TSH)), markers of viral infections (the use of lateral flow immunoassays for the detection of specific viral antibodies); etc.

Another important field of diagnostic determinations relate to pregnancy and fertility, e.g. pregnancy tests (determination of i.a. human chorionic gonadotropin (hCG)), ovulation tests (determination of i.a. luteneizing hormone (LH)), fertility tests (determination of i.a. follicle-stimulating hormone (FSH)) etc.

Yet another important field is that of drug tests, for easy and rapid detection of drugs and drug metabolites indicating drug abuse; such as the determination of specific drugs and drug metabolites (e.g. THC) in urine samples etc.

The term "analyte" is used as a synonym of the term "marker" and intended to encompass any substance that is measured quantitatively or qualitatively.

The terms "zone", "area" and "site" are used in the context of this description, examples and claims to define parts of the flow path on a substrate, either in prior art devices or in a device according to the invention.

The term "reaction" is used to define any reaction, which takes place between components of a sample and at least one reagent or reagents on or in said substrate, or between two or more components present in said sample. The term "reaction" is in particular used to define a reaction, taking place between an analyte and a reagent as part of the qualitative or quantitative determination of said analyte.

The term "substrate" here means the carrier or matrix to which a sample is added, and on or in which the determination is performed, or where the reaction between analyte and reagent takes place.

The term "chemical functionality" comprises any chemical compound or moiety necessary for conducting or facilitating the assay. One group of chemical compounds, with particular relevance in the present invention, are compounds or components exhibiting specific affinity to, or capability of binding or interacting with, one or more components in the sample. Red blood cell separating agents constitute an illustrative example. Such agents may be any substance capable of aggregating or binding red blood cells.

Preferred agents are positively charged materials such as polycations, including e.g., poly-L-lysine hydrobromide; poly(dimethyl diallyl ammonium) chloride (Merquat TM-100, Merquat TM 280, Merquat TM 550); poly-L-arginine hydrochloride; poly-L-histidine; poly(4-vinylpyridine), poly(4-vinylpyridine)hydrochloride; poly(4-vinylpyridine) cross-linked, methylchloride quaternary salt; poly(4-vinylpyridine-co-styrene); poly(4-vinylpyridinium poly(hydrogen fluoride)); poly(4-vinylpyridinium-P-toluene sulfonate); poly(4-vinylpyridinium-tribromide); poly(4-vinylpyrrolidone-co-2-dimethylaminoethyl methacrylate); poly vinylpyrrolidone, cross-linked; poly vinylpyrrolidone, poly(melamine-co-formaldehyde); partially methylated; hexadimethrine bromide; poly(Glu, Lys) 1:4 hydrobromide; poly(Lys, Ala) 3:1 hydrobromide; poly(Lys, Ala) 2:1 hydrobromide; poly-L-lysine succinylated; poly(Lys, Ala) 1:1 hydrobromide; and poly(Lys, Trp) 1:4 hydrobromide. The most preferred polycation is poly (dimethyl diallyl ammonium) chloride (Merquat TM-100).

The red blood cell separating agent may be used in any suitable amount, which functions to separate the red blood cells from the rest of the sample. Preferably, the red blood cell separating agent may be present in a concentration of from about 0.04% to about 1.3% (weight per volume), with from about 0.13% to about 0.33% (weight per volume) being more preferred, and about 0.20% to about 0.33% (weight per volume) being most preferred.

A positive charge on the red blood cell separating agent has a tendency to aggregate any negatively charged agent present on the strip. For example, a labeled substance or conjugate bound to the chromatography carrier may also be aggregated by the red blood cell separating agent interfering with binding of the analyte to the conjugate or; in a competitive assay, the binding of the labeled substance and the analyte of interest to the trapping substance at the detection site or a conjugate. Ultimately, the sensitivity and accuracy of the immunoassay system may be compromised.

Accordingly, when the blood cell separating agent is a positively charged material, the present invention preferably employs a neutralization agent. The neutralization agent is capable of neutralizing the positive charge of the red blood cell separating agent, thereby eliminating or at least minimizing any interference to the assay system caused by the red blood cell separating agent. Preferably, the neutralization agent is diffusively bound to the chromatographic carrier. The neutralizing agent may be diffusively bound at any location on the chromatographic carrier where it will function to neutralize a red blood cell separating agent, but is preferably located downstream of the red blood cell separating agent and upstream of the detection site, and more preferably is located at the same place on the chromatographic carrier as the diffusively bound labeled substance.

The neutralizing agent may be any polyanion capable of neutralizing the positive charge of the red blood cell separating agent. Preferred polyanions include poly(acrylic acid), poly(acrylic acid, Na salt), poly(methyl methacrylic acid), poly(Na-4-styrene sulfonate), poly(vinyl sulfonic acid), poly-L-aspartic acid, and carboxymethyl cellulose, with dextran sulfate being the most preferred.

The neutralization agent may be present in any amount which functions to neutralize the positive charge of the red blood cell separating agent. Generally, the concentration of the neutralization agent is dependent upon the concentration of the red blood cell separating agent being used. Preferably, the neutralizing agent is present in a concentration of from about 0.33% to about 20% (weight per volume), with about 0.34% to about 10% (weight per volume) being more preferred and 0.34% to 10% (weight per volume) being most preferred.

The term "biological functionality" comprises all biological interactions between a component in a sample and a reagent on or in the substrate, such as catalysis, binding; internalisation, activation, or other biospecific interaction. Suitable reagents include, but are not limited to, antibodies, antibody fragments and derivates, single chain antibodies, lectines, DNA, aptamers, etc., including other polymers or molecules with binding capacity. Such reagents can be identified by a person skilled in the art, following the choice of the component to be separated, using standard experimentation, e.g. screening methods and chemical libraries.

The term "physical functionality" here comprises functionalities involved in reactions and interactions other than those that are mainly chemical or biological. Examples include diameter, height, shape, cross section, surface topography and surface patterns, the number of projections per unit area, wetting behavior of the surface of said projections, or a combination thereof, and/or other functionalities influencing the flow, retention, adhesion or rejection of components of the sample.

The distinctions between chemical, biological and physical interactions are not always clear, and it is possible that an interaction, such as an interaction between a component in a sample and a reagent on the substrate, involves both chemical, biological and physical elements.

The terms "hydrophilic" and "hydrophobic", as in hydrophilic or hydrophobic compounds, hydrophilic or hydrophobic interactions etc., have the meaning generally understood by a person skilled in the art, and corresponding to that used in generally recognised textbooks.

DESCRIPTION OF PREFERRED EMBODIMENTS

The present invention makes available a device and method for the separation of a component in a liquid sample during or prior to the detection of an analyte in said sample, wherein a sample is added to a receiving zone on a substrate, said substrate optionally further comprising a reaction zone, a transport or incubation zone connecting the receiving and reaction zone, respectively, forming a flow path on a substrate, wherein said substrate is a non-porous substrate, and at least part of said flow path consists of areas of projections substantially vertical to said surface, and having a height (H), diameter (D) and reciprocal spacing (t1, t2) such, that lateral capillary flow of said liquid sample in said zone is achieved, and where means for separation are provided adjacent to the zone for receiving the sample. Said means for separation are chosen among filter means, optionally enhanced by affinity binding and/or aggregation; magnetic means, also optionally enhanced by affinity binding and/or aggregation; and acoustic means.

The device and method are further defined in the attached claims, incorporated herein by reference.

The device according to the present invention is built on a plastic substrate, preferably thermoplastic, or a substrate having a plastic upper layer. This can in turn be coated or derivatised, e.g. using techniques such as sputtering, vapour deposition and the like, and given a coating of silicon, a metal or other. The present invention can also be made of silicon or glass substrates. According to a preferred embodiment the substrate is given a hydrophilic treatment or coating, e.g. by subjecting the substrate to an oxidative treatment, such as e.g. gas plasma treatment, coating with a hydrophilic substance such as silicon oxide, hydrophilic polymers such as dextran, polyethylene glycol, heparin and derivatives thereof, detergents, biologic substances such as polymers, etc.

According to one embodiment of the present invention, said means for separation comprise a filter or filtering zone, located on said substrate in said flow path, said filter comprising projections substantially vertical to said surface, and having a height (H), diameter (D) and reciprocal spacing (t1, t2) such, that lateral capillary flow of said liquid sample in said zones is achieved, while the components to be separated are substantially prevented from passing said filter.

According to another embodiment, said filtering zone is provided adjacent to the zone for receiving the sample, said filtering zone having projections substantially vertical to its surface, having a height (H), diameter (D) and reciprocal spacing (t1, t2) forming a gradient with regard to the diameter (D) and/or reciprocal spacing (t1, t2) such that components of the sample are gradually retained.

According to a preferred embodiment of the invention, said receiving zone further contains means enhancing the separation capability of said means for separation. Said means are preferably predispensed in the receiving zone. Preferably, said means are compounds capable of forming aggregates of said component to be separated. Such compounds or means are chosen among those defined as having a chemical, biological and/or physical functionality as defined above.

According to one embodiment, said means are beads, derivatised with or carrying on their surface compounds capable of forming aggregates of said component to be separated.

Suitable beads are available from different suppliers, either derivatised or "naked". One example is the Dynabead® product line, available from Dynal Biotech A/S, Oslo, Norway.

According to another embodiment, said reciprocal spacing (t1, t2) is in the interval of 1-100 µm, and preferably said spacing varies within said means for separation, forming a gradient in the direction of the flow. According to a particular embodiment, suitable for the removal of red blood cells, said spacing varies from about 7 to about 1 µm.

According to another embodiment, said receiving zone forms a basin capable of containing the part of the sample separated by the means for separation.

A general embodiment is illustrated in FIG. 1a and 1b, showing a part of a device where the surface of a substrate is covered by projections substantially vertical to said surface, and having a height (H), diameter (D) and reciprocal spacing (t1, t2) such, that lateral capillary flow is achieved.

Another embodiment is illustrated in FIG. 2, showing a part of a device comprising a substrate 20 with vertical projections 22 on its surface, where the sample-receiving area A1 does not have such projections on its surface, but where the adjacent area A2 has projections forming a gradient, and the subsequent area A3 functioning as a zone or zones for incubation, transport, reaction, and/or detection.

According to an embodiment, means for separation are predispensed in the sample receiving zone, preferably in a form that allows their dispersion or solution upon addition of the sample. Said means can be chemical or biochemical compounds deposited, e.g. lyophilised on the substrate. Suitable methods and auxiliary agents can be used, as well known to a skilled person familiar with techniques for deposition reagents on surfaces.

Further, according to another embodiment of the invention, the separation is based on affinity reactions, and said projections or at least a sub-set thereof are provided with a chemical, biologic or physical functionality, as defined above. The projections may have chemically reactive groups on their surface. The projections may also have substances with biological affinity on to their surface.

According to a related embodiment, the projections carry structures or groups having a chemical, biologic or physical functionality, as defined above Particularly suitable are compounds or groups binding to the particles in question, e.g. the red blood cells. Sugar binding molecules are one example, and in particular lectins, which have been shown to be capable of agglutinating the red blood cells. Further examples include preferably multivalent compounds or constructs, i.e. compounds or constructs presenting two (bivalent) or more binding groups (multivalent). Antibodies and similar reagents are examples of bivalent binders.

Multivalent constructs can also be made on the base of commercially available particles, e.g. so called beads, acting as the core for one or more binding groups, or based on a neutral compound, e.g. albumin, to which two or more binding groups are attached. Suitable beads are available from different suppliers, either derivatised or "naked". One example is the Dynabead® product line, available from Dynal Biotech A/S, Oslo, Norway. Techniques for the adaptation or derivatisation of beads, and for the coupling of functional groups to e.g. albumin are known in the art. Suitable binders can be identified without inventive effort by a person skilled in the art, following the choice of the component to be separated. Possible derivatisation of commercial beads lies also with the skills of a person familiar with the relevant art.

According to yet another embodiment, the projections have a physical property selected from the projection diameter (D), height (H), reciprocal spacing (t1, t2), shape, cross section, surface coating, the number of projections per unit area, wetting behavior of the surface of said projections, or a combination thereof, according to the desired end use of the substrate.

According to another embodiment, particles are provided chemically or physically bound to the substrate, or mechanically trapped within a region comprising a plurality of projections. Said particles are chosen among commercially available particles, so called beads, and may have a core of glass, metal or polymer, or a combination of these, and they optionally carry on their surface one or more chemical, biological or physical functionality, as defined above. Preferably, said beads have, bound to their surface, agents with specific affinity to the component to be separated. More preferably, said beads have a magnetic core. Such beads, either "naked" or derivatised, are commercially available, for example from Dynal Biotech A/S, supra. Possible derivatisation of such beads can be performed by a skilled person, using known or slightly modified protocols, or according to the manufacturer's instructions.

According to a preferred embodiment of the invention, the inventive device either comprises a magnet, or is adapted to be used in conjunction with a magnet. Preferably said magnet is a permanent magnet or an electromagnet. When said magnet is incorporated into the device, it is preferably an electromagnet, which can be activated using a signal or impulse coming from auxiliary equipment outside the device itself.

According to another embodiment of the device, said receiving zone forms a basin capable of containing the part of the sample separated from the flow by the means for separation. In this embodiment, said magnet is preferably positioned in the vicinity of said basin, and most preferably below or upstream of the receiving zone.

According to one embodiment, magnetic or paramagnetic beads are used, said beads being derivatised with groups having affinity for the particles to be separated from the flow, or affinity for groups on these particles. Suitable magnetic beads are available from different suppliers, either derivatised or "naked". One example is the Dynabead® product line, available from Dynal Biotech A/S, Oslo, Norway. Another example are the functional magnetic beads from Bioclone Inc., San Diego, Calif., USA. These are uniform superparamagnetic 1 µm or 5 µm diameter beads with different surface groups such as amine, carboxy, aldehyde, epoxy, IDA, hydrazide, NADPA etc. As noted above, possibly necessary derivatisation of such beads can be performed by a skilled person, using known or slightly modified protocols, or according to the manufacturer's instructions.

The magnetic beads are brought in contact with the sample, and allowed to attach to the particles to be separated. Magnetic force is then applied to the sample, preferably in or near the proximal end of the lateral flow path, in order to retain the beads with the particles bound thereto at an early stage. Magnetic force can be applied externally, e.g. by bringing a magnet in close association with the flow path, either below, above or at either side of the flow path, preferably below or at the side of the flow path. Magnetic force can also be applied by incorporating a magnet or magnetic particles in the substrate, at a point below or at the side of the lateral flow path. These embodiments are schematically illustrated in FIGS. 6a, b and c.

In FIG. 6a, an embodiment is shown, where a flow path is provided on a substrate 60, the direction of flow being indicated by an arrow A from left to right. A sample is added to a receiving zone 62, in which zone magnetic particles, derivatised to exhibit affinity to the components to be separated, are predispensed. Upon addition of the sample, the particles mix with the sample, and the mixture travels laterally in the direction A through capillary action. In a separation zone indicated as 64, the particles are subjected to a magnetic force, drawing the particles away from the main flow, as indicated by the arrow B. The magnetic force can originate from a permanent magnet or an electromagnet, here denoted M, either incorporated into the substrate 60 (not shown) or positioned in the vicinity of said substrate. The sample flow, depleted of the component removed by the magnetic action, continues into further reaction and detection zones, here indicated as 66.

Figure 6B:
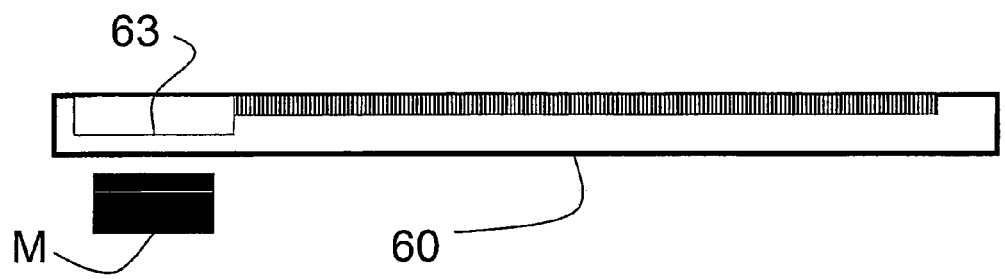

Another embodiment is illustrated in FIG. 6b, where on a substrate 60, the sample is added to a sample receiving zone 63, containing predispensed magnetic particles, derivatised to exhibit affinity to the components to be separated. Said zone 63 is preferably slightly lower than the remaining flow path, but can also be level with the same. The sample receiving zone can contain substantially vertical projections or lack such projections. In the vicinity of the receiving zone 63, and preferably below said zone, a magnet M is positioned. Preferably said magnet, when a permanent magnet, is brought into the vicinity of the receiving zone a certain time after addition of the sample, sufficient for the reaction between the sample and the magnetic particles to take place. When said magnet M is an electromagnet, it is activated only a certain time after addition of the sample, sufficient for the reaction between the sample and the magnetic particles to take place. When the permanent magnet is in place or the electromagnet activated, components bound to derivatised particles will be prevented from leaving the zone 63, and the remaining sample, depleted with respect to unwanted components, will be drawn by capillary action along the flow path towards subsequent reaction, incubation and detection zones (not shown).

Figure 6C:
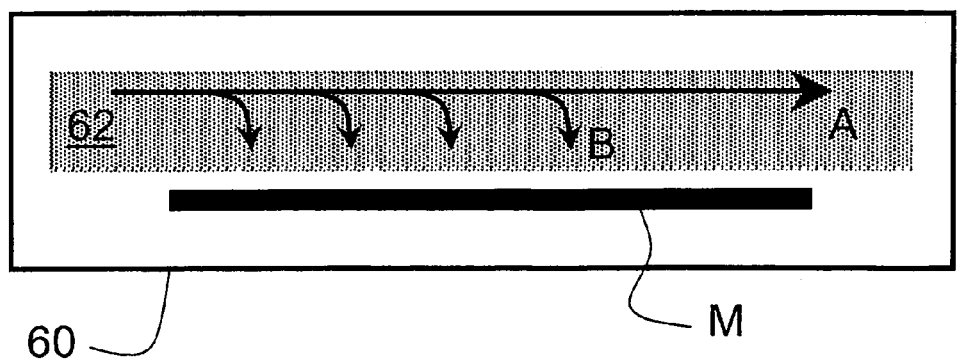

Yet another embodiment is illustrated in FIG. 6c, where a magnet M is positioned along the flow path on a substrate 60. Sample is added to a sample receiving zone 62 containing predispensed magnetic particles, derivatised to exhibit affinity to the components to be separated. The sample and said particles will be drawn in the direction of the arrow A by capillary action, and when reaching the magnet M positioned alongside the flow path, the magnetic particles will deviate from the flow, as indicated by the arrows B. Said magnet is either a permanent magnet, or an electromagnet, activated a certain time after addition of the sample, sufficient for the reaction between the sample and the magnetic particles to take place.

The above embodiments may also be combined, e.g. in an embodiment where a depressed area borders to a raised area, or an area in level with the remaining surface of the substrate, of raised above said surface, and where the projections are placed on the border between said depressed and raised areas, the distance between said posts, as well as their width, height and shape, being chosen so, that when a sample of whole blood is added to said depression, the red blood cells are prevented from leaving the depression, whereas the plasma or serum will flow through said area having vertical projections.

The device according to the invention is advantageously used in analytical applications where the liquid sample contains particulate matter, such as cells, tissue debris, organic or inorganic matter, other contamination etc, which is desired to separate from the bulk of the sample. One important application is when the liquid sample is whole blood and in such cases, the lateral capillary flow involves the separation of red blood cells from plasma without significant rupture of said cells. According to one embodiment, such separation in general, and in particular the gentle separation of red blood cells, is achieved in a gradient of projections wherein the spacing ($t1$, $t2$) decreases from about 7 μm to about 1 μm over the length of said filtering zone.

According to one embodiment said receiving zone forms a basin for components separated from the lateral flow, e.g. particulate matter or cells prevented from passing between the projections, or entering that space only to a limited degree. Said basin is formed in that the flow of liquid is restricted, i.e. prevented or delayed, in one or preferably more directions. When the basin has a substantially square or rectangular shape, the flow of liquid is restricted, preferably prevented, in three directions, the forth direction being the one where the liquid is forced to pass over or through a filtering zone. If the basin is substantially round or elliptic, the flow of liquid is restricted, preferably prevented over at least 180 degrees of its circumference, preferably 210 degrees and most preferably about 270 degrees of its circumference. The restriction or prevention of liquid flow may consist in walls or raised portion surrounding the basin. The restriction of flow may also consist in the basin being at least partially surrounded by material that does not support lateral flow, e.g. material that does not support capillary transport due to the configuration, density etc of the material, non-porous material, material impregnated with agents repelling the liquid, e.g. strongly hydrophobic material etc.

According to another embodiment, the basin is lowered in relation to the plane of the lateral flow. Preferably said filtration zone is arranged as the border leading to the remaining lateral flow path. More preferably, the filtration zone is arranged on a raised portion, forming a threshold between said basin and the lateral flow path.

According to one particular embodiment for the separation of components from a liquid sample, e.g. red blood cells from plasma, said device has an area, optionally a depressed area, surrounded on at least part of its circumference by projections, the distance ($t1$, $t2$) between said projections, as well as their diameter (D), height (H) and shape, being chosen so, that when a sample of whole blood is added to said area, the red blood cells are prevented from leaving said area by the projections down stream of said depression, whereas the plasma will flow through or between said projections.

According to an embodiment of the invention, the particulate matter present in the sample is particulate matter, which is capable of travelling with the lateral flow. In applications where said liquid sample is whole blood, it is important that said lateral capillary flow involves the transportation (when applicable) and an optional subsequent separation of red blood cells without significant rupture of said cells. This is achieved by the present invention through the control of one or more of the parameters of the projections, such as the height (H), diameter (D) and reciprocal spacing ($t1$, $t2$), as well as the chemical or biochemical derivatisation of the projections.

The spacing ($t1$, $t2$) between said projections can be varied depending on the intended use and the properties of the liquid sample, as well as the properties of components to be separated or transported, and preferably is in the interval of 1 to 100 μm, more preferably in the interval of 1 to 50 μm. The distance between said projections can be chosen by a skilled person, considering which sample the device is intended for, the properties of said sample, and the properties of the components that are to be separated.

In a particularly preferred embodiment, the separation is achieved both by the action of gravity and a filtering action. In this embodiment, schematically illustrated in FIGS. 3a, 3b, 4a, 4b, 5a, 5b, and 6b, the provision of a first volume or basin help to retain part of the unwanted particles, as they are less capable of passing over the threshold 34, 44, and 54, and therefore sediment in the basin. Further, the provision of vertical projections 36, 46, and 56', 56", 56''' function as a filter, separating the particles from the liquid. In applications where the function of the filter is to separate red blood cells from plasma, these vertical projections preferably have a height of about 10 μm and a mutual distance of about 3 μm. For the separation of other particles, different dimensions are contemplated. Also, when the separation is aided by other means, such as magnetic and/or chemically derivatised beads, multivalent chemical compounds etc., different dimensions may be used.

In the embodiment shown as FIGS. 3a and 3b, the vertical projections 36 cover substantially the entire surface of the threshold 34. It is understood that the projections can be arranged in other configurations, as long as they form a continuous filter barrier across the flow path. FIGS. 4a and 4b show an embodiment where the projections 46 are arranged single-file in a meandering fashion over the surface of the threshold 44. Further, in this figure, means 43 and 47 are shown, where 43 indicates extensions of the ridges 42 engaging the proximal edge of the surface 44, and 47 indicates L-shaped members engaging the distal edge of the surface 44, and leading into the remaining flow path. The means 43 and 47 enhance the liquid flow over the threshold.

According to yet another embodiment, ultrasonic standing waves are used to separate particle present in a liquid flow, in a flow path on or in a device according to the invention, based on the acoustic response of the particles. Particles suspended in a liquid medium are known to collect in the nodes of standing ultrasonic waves, and this has been used separation purposes in the past.

For example Riera-Franco de Sarabia et al., (Application of high-power ultrasound to enhance fluid/solid particle separation processes, Ultrasonics. 2000 March; 38(1-8): 642-6), present possibilities to use ultrasonic energy to assist conventional separation techniques. Ultrasonic separation has also been applied in surgery, e.g. for the separation of lipid particles in blood during major surgery, significantly reducing embolic load to the brain after cardiac surgery. See e.g. Jonsson et al. (Particle separation using ultrasound can radically reduce embolic load to brain after cardiac surgery, Ann Thorac Surg. 2004 November; 78(5): 1572-7; discussion 1577-8. According to Jonsson et al., the mean separation rates for lipid particles were 81.9%+/−7.6% and for erythrocytes 79.8%+/−9.9%, and both were related to the hematocrit level of the incoming blood sample. Importantly, the procedure was atraumatic and did not cause hemolysis. The authors conclude that particle separation by means of an acoustic standing-wave technique can be used for atraumatic and effective removal of lipid particles from blood, with the possible clinical implication of reducing neurocognitive complications after cardiopulmonary bypass. The authors of the cited article are also the inventors behind the patent SE 0100819-2 concerning a device for the separation of suspended particles from a fluid using ultrasound and method of such separation.

According to the present invention, ultrasonic standing waves are created in the lateral flow, preventing the unwanted particles from advancing, and facilitating the flow of particle depleted sample further down the flow path. One example is the immobilization of red blood cells using standing waves, where blood cell depleted plasma will be drawn along the flow path by capillary action.

The standing wave is created by arranging either two transducers of the same frequency facing each other through the liquid flow path, or by a reflector facing a single transducer, or by several transducer-reflector pairs. The transducers or the reflector and transducer can be arranged above and below the flow path, to either side of the flow path, or otherwise making sure that the nodes of the standing waves are formed within the flow path.

Thus, according to one embodiment, said means for subjecting the sample to ultrasonic standing waves comprise at least two ultrasonic energy sources arranged to establish a pattern of nodes within the flow path by interference between their outputs defining a standing wave.

According to an alternative embodiment, said means for subjecting the sample to ultrasonic standing waves comprise at least one ultrasonic energy source and a reflector, or two ultrasonic energy sources with corresponding reflectors, arranged to establish a pattern of nodes within the flow path by interference between their outputs defining a standing wave.

Said transducer(-s) and reflector may be incorporated in the device according to the invention, or provided in an auxiliary device, e.g. incorporated in a device used for reading the result. More information on the creation of standing waves can be found in general textbooks on ultrasonics, e.g. "Fundamentals of Ultrasonics, by J. Blitz, Butterworths, 1967. Ultrasonic filters are also disclosed in patents, see e.g. UK 2098498, inventor: R. Sayles, and EP 147 032, inventor: C. J. Schram.

The present invention also makes available a device suitable for use in or together with a device for detection of an analyte in a liquid sample, wherein said device has projections substantially vertical to its surface, said projections having a height (H), diameter (D) and reciprocal spacing (t1, t2) such, that said device is capable of separating components of said liquid sample while achieving a lateral flow of said liquid sample. This device may have one or more of the properties and functionalities described above, depending on its intended use.

This device may be used separately, in association with, or integrated in a device for the analysis of a liquid sample. This device may function as a pre-treatment step in or before a conventional analysis.

The present invention also makes available methods for performing an assay on a liquid sample, said sample being applied to a substrate having a zone for receiving the sample, which is in fluid connection with a reaction zone, and optionally a transport or incubation zone connecting the receiving and reaction zone, respectively, wherein said substrate is a non-porous substrate, and said receiving zone, an optional reaction zone, transport or incubation zone, consist of areas of projections substantially vertical to said surface, and having a height (H), diameter (D) and reciprocal spacing (t1,t2) such, that lateral capillary flow of said liquid sample in said zone is achieved.

According to one embodiment of these methods, a filtering step is performed following the addition of the sample, said filtering effected in a filtering zone by projections substantially vertical to the surface of said substrate, the projections having a height (H), diameter (D) and reciprocal spacing (t1, t2) forming a gradient with regard to the diameter (D) and/or reciprocal spacing (t1, t2) such that components of the sample are gradually retained.

Said reciprocal spacing (t1, t2) is preferably in the interval of about 1 to about 100 µm, more preferably from about 7 to about 1 µm.

Alternatively, said separation is achieved using filtering means having projections substantially vertical to the surface of said substrate, and having a height (H), diameter (D) and reciprocal spacing (t1, t2) such, that the compound to be separated from the sample is substantially prevented from leaving the receiving zone.

In the method according to the invention, means enhancing the separation capability of said means for separation are preferably provided in said receiving zone. Said means are preferably compounds capable of forming aggregates of said component to be separated.

According to one embodiment, said means are beads, derivatised with or carrying on their surface compounds capable of forming aggregates of said component to be separated.

According to another embodiment, the part of the sample separated by the means for separation is contained in a basin, formed by said receiving zone.

According to a preferred embodiment of the invention, said separation is enhanced by means having specific affinity to the component to be separated and said means are provided in the flow path. Preferably said means are projections substantially vertical to the surface of said substrate, and having a height (H), diameter (D) and reciprocal spacing (t1, t2) such, that capillary flow of the sample is possible, and said projections are provided with, bound to their surface, agents with specific affinity to the component to be separated. Alternatively, said means are beads having, bound to their surface, agents with specific affinity to the component to be separated.

Preferably, said beads have a magnetic core. Suitable magnetic beads are available from different suppliers, either derivatised or "naked". One example is the Dynabead® product line, available from Dynal Biotech A/S, Oslo, Norway. Another example are the functional magnetic beads from Bioclone Inc., San Diego, Calif., USA. These are uniform superparamagnetic 1 µm or 5 µm diameter beads with different surface groups such as amine, carboxy, aldehyde, epoxy, IDA, hydrazide, NADPA etc. A skilled person will be able to, without undue burden, to order suitable beads or to modify existing beads. Modification or derivatisation can be performed according to existing protocols, modified protocols, or according to the manufacturer's instructions, by a person skilled in the art.

According to a preferred embodiment, said beads are retained or removed from the flow by a magnet arranged in or adjacent to said device. Said magnet may be a permanent magnet or an electromagnet.

According to an embodiment of the invention, the part of the sample separated from the flow by the means for separation is contained in a basin, formed by said receiving zone. In this embodiment, when using a magnet, said magnet is positioned in the vicinity of said basin, preferably below or behind said receiving zone, in relation to the direction of the flow.

According to another embodiment of the present invention, said separation is enhanced by subjecting the sample to ultrasonic standing waves. Preferably the sample is subjected to ultrasonic standing waves by at least two ultrasonic energy sources arranged to establish a pattern of nodes by interference between their outputs defining a standing wave within the flow path.

Alternatively, said sample is subjected to ultrasonic standing waves by at least one ultrasonic energy source and a reflector, or two or more sources and their corresponding reflectors, arranged to establish a pattern of nodes by interference between their outputs defining a standing wave within the flow path.

These methods can be used for all applications where components of a liquid sample need to be separated from the bulk of the sample. The methods are however particularly suitable for applications where said liquid sample is whole blood and said lateral capillary flow involves the separation of red blood cells from plasma without significant rupture of said cells.

The device according to the present invention surprisingly replaces prior art devices where the substrate, and/or one or more of said zones were made of a porous material such as nitrocellulose, cellulose, asbestos fibres, glass fibres and the like.

ADVANTAGES OF THE INVENTION

An advantage of the device according to the invention is the increased speed of the determination, as no separation of cellular material is necessary, or when such separation is desired, rapid separation takes place.

Another advantage of the device is that, due to the open, regular structure and the defined properties of the capillary flow zones, the addition of reagents to these zones or the derivatisation of the surface of the projections is greatly-simplified.

Yet another advantage of the device is the uniformity of the structure not only within a single device, but also between all devices produced. This result in significantly increased reliability and repeatability of the assays built on the inventive device.

An important advantage of the inventive device is that the degree of separation, from none to total, of the blood cells, can be accurately controlled.

The inventive device has many advantages with respect to the manufacturing process. All capillary zones can be made in one step and no assembly of parts is required. Optionally, a cover having at least one aperture for sample addition and one reading the result of the assay can be placed over the substrate and the capillary zones.

Although the invention has been described with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

The invention claimed is:

1. A device for the separation of a component in a liquid sample prior to the detection of an analyte in said liquid sample, said device having a non-porous substrate having a substrate surface and comprising:
   a sample receiving zone formed in a portion of the substrate;
   a separator element including a plurality of first projections extending substantially vertical to said substrate surface, said plurality of first projections having a height, diameter, and reciprocal spacing, in which the plurality of first projections, based on at least one of the dimensions or the reciprocal spacing between the first projections, forms a gradient in a direction of flow such that separation of the component occurs, and wherein said separator element is provided adjacent to or in said receiving zone wherein the separator element includes a filtration zone having the plurality of first projections which is arranged as a threshold adjacent to and raised in relation to the sample receiving zone; and a transport or incubation zone connected to said filtration zone thereby forming a lateral flow path on said nonporous substrate extending from the sample receiving zone to the transport or incubation zone, wherein at least part of said flow path outside of the filtration zone has areas of second projections substantially vertical to said substrate surface, said first and second projections each having a height, a diameter and a reciprocal spacing such that lateral capillary flow of said liquid sample in said transport or incubation zone is achieved, said flow path being defined by an open flow path wherein said lateral capillary flow is induced solely due to the height, diameter and reciprocal spacing of said first and said second projections without requiring additional structure to induce or assist said flow.

2. The device according to claim 1, wherein the gradient with regard to the diameter or reciprocal spacing of said first projections substantially prevents said separated component from leaving said receiving zone.

3. The device according to claim 1, wherein said receiving zone further contains an enhancing element that enhances the separation capability of said separator element.

4. The device according to claim 3, wherein said enhancing element are compounds capable of forming aggregates of said component to be separated.

5. The device according to claim 4, wherein said compounds are beads derivatised with, or carrying on their surface, compounds capable of forming aggregates of said component to be separated.

6. The device according to claim 5, wherein said beads are selected from the group consisting of glass beads, polymer beads, metal beads, and a combination of glass beads, polymer beads, or metal beads.

7. The device according to claim 1, wherein said reciprocal spacing of said first projections is in an interval of 1-100 μm.

8. The device according to claim 7, wherein said reciprocal spacing of said first projections varies, forming a gradient in the direction of flow.

9. The device according to claim 8, wherein said reciprocal spacing of said first projections varies from about 7 to about 1 μm.

10. The device according to claim 1, wherein said receiving zone forms a basin sized to contain a part of the sample separated by said separator element.

11. The device according to claim 1, further comprising a second separator element provided adjacent to or in said receiving zone having specific affinity for said component to be separated.

12. The device according to claim 11, wherein said second separator element having specific affinity for said component to be separated is a compound that is soluble or dispersible in said liquid sample and predispensed in said receiving zone.

13. The device according to claim 11, wherein said second separator element having specific affinity for said component to be separated are agents with specific affinity to said component to be separated bound to the surface of the first projections.

14. The device according to claim 11, wherein said separator element having specific affinity for said component to be separated are beads, having bound to their surface, agents with specific affinity for said component to be separated.

15. The device according to claim 14, wherein said beads have a magnetic core.

16. The device according to claim 15, wherein said device further comprises a magnet.

17. The device according to claim 16, wherein said magnet is an electromagnet.

18. The device according to claim 11, wherein said receiving zone forms a basin capable of containing a part of said liquid sample separated by said second separator element.

19. The device according to claim 18, wherein a magnet is positioned in the vicinity of said basin.

20. The device according to claim 1, further comprising an element for subjecting the sample to ultrasonic standing waves.

21. The device according to claim 20, wherein said element for subjecting the sample to ultrasonic standing waves comprises at least two ultrasonic energy sources arranged to establish a pattern of nodes within said flow path by interference between their outputs, defining a standing wave.

22. The device according to claim 20, wherein said means for subjecting the sample to ultrasonic standing waves comprises at least one ultrasonic energy source and a reflector, arranged to establish a pattern of nodes within said flow path by interference between their outputs, defining a standing wave.

23. The device according to claim 20, wherein said receiving zone forms a basin capable of containing a part of said liquid sample separated by said element for subjecting the sample to ultrasonic standing waves.

24. The device according to claim 1, wherein said substrate is a plastic substrate.

25. The device according to claim 24, wherein said plastic substrate is a thermoplastic substrate.

26. The device according to claim 1, wherein said substrate is silicon substrate or a glass substrate.

27. The device according to claim 1, wherein said plurality of first projections border at least portions of the raised filtration zone.

28. The device according to claim 1, wherein the filtration zone is raised relative to the transport or incubation zone.

29. The device according to claim 1, wherein the plurality of first projections is defined by a height, diameter and reciprocal spacing that is smaller than that of the plurality of second projections.

* * * * *